UNITED STATES PATENT OFFICE.

AUGUSTUS BISCHLER, OF BASLE, SWITZERLAND, ASSIGNOR TO BASLE CHEMICAL WORKS, OF BASLE, SWITZERLAND, A FIRM.

PROCESS OF MAKING PHTHALIC AND BENZOIC ACIDS.

SPECIFICATION forming part of Letters Patent No. 702,171, dated June 10, 1902.

Application filed August 9, 1901. Serial No. 71,475. (No specimens.)

*To all whom it may concern:*

Be it known that I, AUGUSTUS BISCHLER, doctor of philosophy and chemist, a subject of the Emperor of Russia, residing at Basle, Switzerland, have invented new and useful Improvements in the Manufacture of Phthalic Acid and Benzoic Acid, of which the following is a clear and complete specification.

It is known that naphthalene and the naphthols may be oxidized with permanganate in the presence of alkali to phthalonic acid (German Letters Patent No. 79,693) and partly to phthalic acid, (*Ber. der Deutsch. Chem. Ges.*, XXI, 1616.) This method, however, is not very advantageous for the manufacture of phthalic acid, as the phthalonic acid has yet to be treated with sour (acid) oxidizing agents, and, moreover, permanganate is too expensive. I have now found that the naphthols can also be oxidized in the presence of alkali with other oxidizing agents than permanganate, even up to phthalic acid, only the oxidation must be performed at higher than water-bath temperature. By heating naphthols with alkali and oxidizing metallic oxids—such as copper oxid, iron oxid, peroxid of barium, peroxid of lead, bioxid of manganese, or others—to over 200° centigrade phthalic acid and benzoic acid are obtained along with few intermediate products. The first product of decomposition resulting from the oxidation of the naphthols is looked upon as ortho-cinnamylic-carbonic acid, which can then be oxidized to phthalic acid. From the phthalic acid benzoic acid can be produced by splitting off carbonic acid; but not only the napthols themselves can be oxidized to phthalic acid and benzoic acid by heating them with alkali and oxidizing metallic oxids, but also the substituted naphthols—such as nitroso-naphthols, nitro-naphthols, naphtholsulfonic acids, &c.; also, other substitutution products of naphthalene—such as nitronaphthalene, naphthylamin, and naphthalenesulfonic acids. Phthalic acid may, for instance, be obtained, along with more or less benzoic acid and intermediate products, from the following starting products and in the following manner:

Example I: Ten parts alpha or beta naphthol, ninety parts caustic soda, or eighty parts caustic potash and ninety parts copper oxid are mixed warm with a little water to a thick paste, then slowly heated to 240° to 270° centigrade, and kept at this temperature until the copper oxid is transformed to cuprous oxid. From the reaction product the greater part of the residual alkali is extracted by lixiviation with as little water as possible. Then the acids which have been formed are dissolved in water and drawn off from the cuprous oxid. The fluid is first nearly neutralized with mineral acids and saturated with carbonic acid, during which process any still-unchanged naphthol is precipitated. After removing this by means of a filter the solution is concentrated and heated while adding sulfuric acid. The acids separated during this process are removed and purified by distillation. The distillation product consists of phthalic acid and benzoic acid, which are separated from each other in the well-known manner.

Instead of oxidizing the naphthas in the presence of a great excess of alkali, as indicated in Example I, the oxidation may be carried out as follows.

Example II: 3.6 kilos naphthol, twenty-six liters soda-lye of 27° Baumé, and thirty-six kilos copper oxid are heated for eight hours under pressure up to 240° to 260° centigrade. After cooling the solution is drawn off from the cuprous oxid, the residue is washed, and the phthalic acid and the benzoic acid are isolated from the concentrated fluid in the above-mentioned manner. If the 3.6 kilos naphthol are heated with only about one-third of the quantity of soda-lye and copper oxid, a product melting at 241° centigrade is obtained, which by further heating with more alkali and metallic oxid is also transformed to phthalic acid and benzoic acid.

If for the decomposition of the naphthols by oxidation such metallic oxids are used as are regenerated with the oxygen of the air from the corresponding protoxid combinations at the reaction temperature, the oxidation may be carried out with less than the theoretical quantity of metallic oxid while passing air or oxygen through the mixture. The oxidation of the naphthols with iron oxid may, for instance, be performed in the following manner.

Example III: Twenty parts alpha or beta naphthol are evaporated in a stirring vessel with one hundred parts soda-lye of fifty per cent. strength or the equivalent quantity of potash-lye and about thirty parts iron oxid, then heated to 225° to 250° centigrade, and then during twelve hours air is passed through the mixture at this temperature. The reaction product is extracted by lixiviation and further treated as in Example I.

Instead of the pure naphthols the naphthol meltings resulting from the heating of naphthalenemonosulfonic acids with alkali can also be used, only in this case one-third molecule of chlorate is added to the mixture of alkili and one molecule naphthalenemonosulfonic acid—i. e., before the melting—so as to transform the sulfite resulting from the melting into sulfate.

From the naphthalenesulfonic acids corresponding to the naphthols phthalic acid may also be obtained in a direct manner, without first transforming them into naphthols, by melting with alkali and metallic oxids of oxidizing influence; but the yields are smaller than when making use of the corresponding quantities of naphthols. I proceed in the same manner as in Example II, with the difference that the quantity of soda-lye is increased by one-third and that the mixture is heated to 260° to 270° instead of to 240° to 260° centigrade. The addition of one-third molecule of chlorate to one molecule of naphthalenesulfonic acid has a favorable effect on the yields of phthalic acid.

The nitroso and nitro naphthols are also easily oxidized to phthalic acid by heating them with alkali or alkali-lye and metallic oxids.

Example IV: 4.3 kilos alpha-nitroso-beta-naphthol are heated under pressure in a digester with twenty-five liters soda-lye of 27° Baumé and twenty-two kilos copper oxid during about two hours up to 200° centigrade, then during three hours up to 240° to 260°. The reaction product is drawn off from the cuprous oxid, the solution is concentrated, and the acids which have been formed are precipitated from the hot solution by means of residuous concentrated sulfuric acid. The phthalic acid may be separated from the benzoic acid by distillation.

As I have found, nitronaphthalene when heated carefully with alkali and metallic oxids of oxidizing influence produces alpha-nitro-beta-naphthol and alpha$_1$-nitro-alpha$_2$-naphthol. (See Example V.) These may be separated from each other by the well-known process and each by itself, or also the mixture can be oxidized by heating with alkali and metallic oxids of oxidizing influence. For this purpose it is, however, not necessary to isolate the nitronaphthols. Phthalic acid may be directly obtained by heating the nitronaphthalene with alkali or alkali-lye and metallic oxids.

Example V: 4.3 kilos nitronaphthalene, seven kilos pulverized caustic soda, and nine kilos iron oxid are well mixed and heated while frequently stirring, best in an oil-bath, for two hours up to 80° centigrade, then for two hours up to 90°, and for two hours up to 100° to 110° centigrade. (During this time the nitronaphthols have formed themselves. They may be isolated by lixiviation with water and by acidulating.) Subsequently the mixture is left to cool somewhat. Then four more kilos of caustic soda and nine kilos iron oxid are added and the mixture is heated to 150° centigrade. The temperature of the mixture then rises of itself to 210° to 220° centigrade, with a lively development of ammonia. It is further heated to 250° centigrade and left to cool. The reaction mixture is extracted by lixiviation with water, and the cooled solution is first carefully mixed with sulfuric acid until a black resinous by-product is precipitated. Then the solution is again filtered and concentrated, and while still hot the phthalic acid and benzoic acid are precipitated from it with residual mineral acid.

Example VI: 4.3 kilos nitronaphthalene and eighteen liters soda-lye of 27° Baumé are heated in a closed digester with twenty-five kilos peroxid of barium and eight liters water for four hours up to 240° to 260° centigrade. The reaction mixture is saturated with carbonic acid extracted hot by lixiviation and the acids isolated in the already-mentioned manner.

In the same manner phthalic acid may be obtained from alpha-naphthylamin. The intermediate products which particularly appear by imperfectly-performed oxidations may be oxidized in the same way.

The above-given examples may be varied in many ways. For instance, the alkaline lye may either be taken more concentrated or more dilute; also, the alkili-lye may partly be replaced by earth-alkalies.

What I claim is—

The herein-described process for the manufacture of phthalic and benzoic acids, which consists in heating to a temperature above 200° centigrade, naphthalene derivatives with an oxidizing metallic oxid and an alkali.

In witness whereof I have hereunto signed my name, this 29th day of July, 1901, in the presence of two subscribing witnesses.

AUGUSTUS BISCHLER.

Witnesses:
GEORGE GIFFORD,
OMAND RITTER.